R. WILSON.
Horse Hay-Rakes.
No. 154,939.　　　　　　　　　　　　　Patented Sept. 8, 1874.
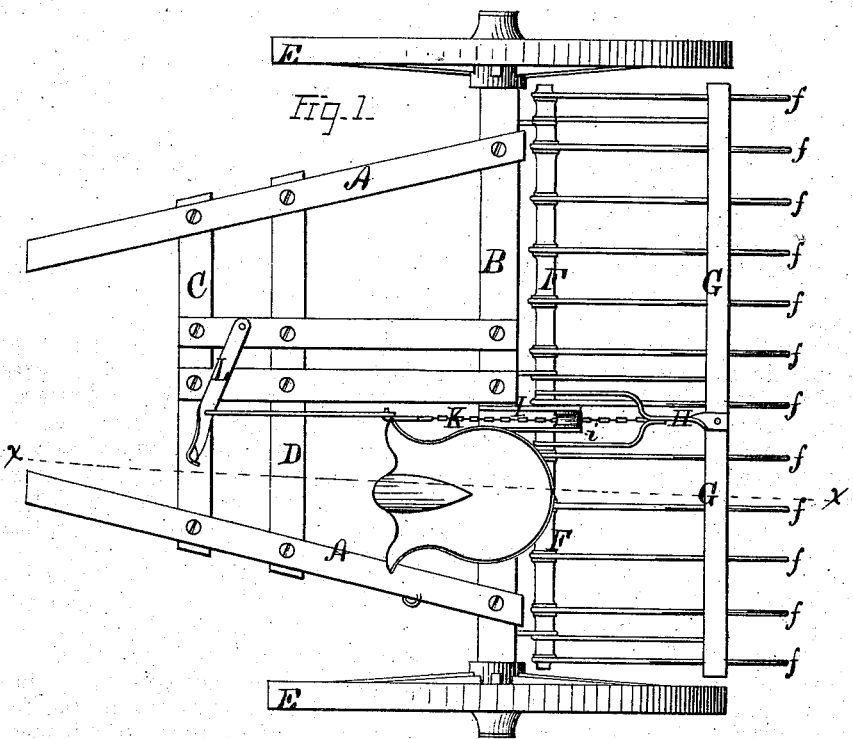
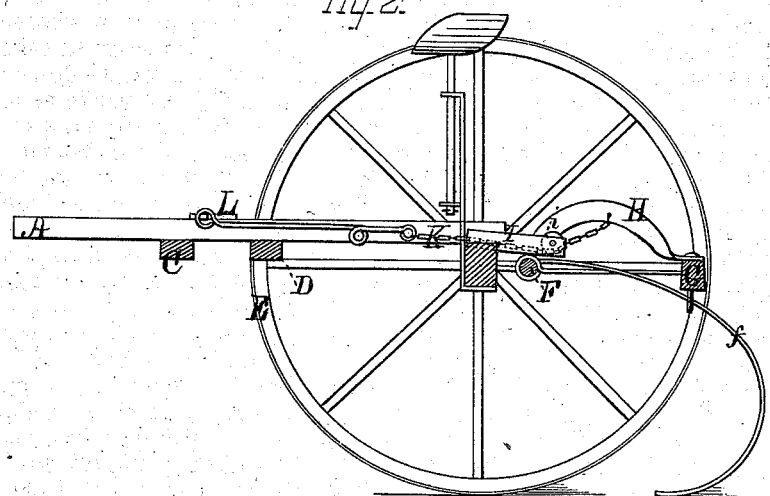
WITNESSES:
Jas. E. Hutchinson
John R. Young
INVENTOR.
Robert Wilson, by
Prindle and Deane, his Attys

UNITED STATES PATENT OFFICE.

ROBERT WILSON, OF ITHACA, NEW YORK.

IMPROVEMENT IN HORSE HAY-RAKES.

Specification forming part of Letters Patent No. 154,939, dated September 8, 1874; application filed June 4, 1874.

*To all whom it may concern:*

Be it known that I, ROBERT WILSON, of Ithaca, in the county of Tompkins and in the State of New York, have invented certain new and useful Improvements in Horse Hay-Rakes; and do hereby declare that the following is a full, clear, and exact description thereof, reference being had to the accompanying drawing, making a part of this specification, in which—

Figure 1 is a plan view of the upper side of a rake containing my improvements, and Fig. 2 is a section of the same upon line $x\,x$ of Fig. 1.

Letters of like name and kind refer to like parts in each of the figures.

The design of my invention is to enable a horse hay-rake to be held in the desired position, with relation to the surface of the ground, with sufficient firmness to prevent it from rising above or falling below such position unless the teeth meet with an obstruction, in which event, from the yielding nature of the pressure applied, said rake shall be permitted to pass such obstruction; to which end it consists in the peculiar construction of the parts composing the "hold-down" device, and their combination with the rake, substantially as and for the purpose hereinafter specified.

In the annexed drawing, A and A represent the side rails of the frame, secured at their rear ends to or upon an axle, B, and connected together at points in front of the latter by means of two cross-bars, C and D, in the usual manner. Upon the ends of the axle B are journaled two ground-wheels, E and E, and at the rear side of said axle is hinged or pivoted the head F of a rake, which has the usual number and form of teeth $f$ and $f$. A pressure-bar, G, extends across the upper side of the teeth $f$ and $f$ in rear of the head, F, and is connected with the latter by means of one or more arms, H, which are secured upon and extend between said parts. Directly in front of the center arm H a bar, I, is secured to or upon the axle B, and, extending rearward over and beyond the rake F, is provided with a grooved pulley, $i$, that receives a chain, K, which chain is attached at its rear end to or upon said arm H, and at its forward end is connected with a foot-lever, L, that is pivoted at one end upon the frame. As thus arranged, it will be seen that, by moving forward the free end of the foot-lever L, the chain K will be drawn taut, and will cause the rake to assume the position shown in Fig. 1, its pressure-bar G being in a line horizontally with the head F, which position can be easily maintained by the pressure of the operator's foot.

When the rake meets with an obstruction, it will rise and draw rearward the chain K and lever L, the unusual pressure upon said lever being sufficient to overcome the force ordinarily applied by the operator, said lever thus operating as an indicator, to convey to said operator intelligence with relation to the work being done by said rake.

The advantage possessed by this device is that, while it places the rake under the full control of the driver, the downward pressure upon said rake is so elastic as to enable the latter to rise and readily pass over obstructions or inequalities of the ground.

Having thus fully set forth the nature and merits of my invention, what I claim as new is—

In combination with the frame of the machine, and with the pivoted rake, the chain K, secured to the upper side of said rake in rear of its head, the pulley $i$, bearing upon the upper side of said chain, and the bar I and foot-lever L, for moving the latter longitudinally, by means of which said rake is prevented from rising or falling beyond the desired position, substantially as specified.

In testimony that I claim the foregoing I have hereunto set my hand this 28th day of May, 1874.

ROBERT WILSON.

Witnesses:
  O. P. HYDE,
  D. TARBELL.